United States Patent
Zanoria et al.

(10) Patent No.: US 12,000,485 B1
(45) Date of Patent: Jun. 4, 2024

(54) DYNAMICALLY VENTED CRANKSHAFT SEAL AND SYSTEMS AND METHODS THEREOF

(71) Applicant: Caterpillar Inc., Peoria, IL (US)

(72) Inventors: Elmer S. Zanoria, Dunlap, IL (US); Keith Harmeyer, Lafayette, IN (US); John Michael Mashak, Peoria, IL (US); Daniel Joshua Smith, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/104,331

(22) Filed: Feb. 1, 2023

(51) Int. Cl.
*F16J 15/32* (2016.01)
*F16J 15/3228* (2016.01)

(52) U.S. Cl.
CPC ................ *F16J 15/3228* (2013.01)

(58) Field of Classification Search
CPC .................................................. F16J 15/3228
See application file for complete search history.

(56) References Cited

U.S. PATENT DOCUMENTS

| | | | |
|---|---|---|---|
| 3,685,838 A * | 8/1972 | Malmstrom | F16J 15/324 277/560 |
| 8,235,391 B2 | 8/2012 | Hatch et al. | |
| 8,714,562 B2 | 5/2014 | Nakagawa et al. | |
| 8,955,849 B2 | 2/2015 | Sedlar | |
| 9,388,905 B2 | 7/2016 | Takahashi | |
| 9,695,940 B2 | 7/2017 | Haynes et al. | |
| 9,927,031 B2 | 3/2018 | Omoto et al. | |
| 10,240,678 B2 | 3/2019 | Toth | |
| 10,844,960 B2 | 11/2020 | Sabotta et al. | |
| 2003/0168817 A1* | 9/2003 | Iwakata | F16J 15/3228 277/549 |
| 2013/0175763 A1* | 7/2013 | Berdichevsky | F16J 15/3244 277/552 |
| 2016/0003359 A1* | 1/2016 | Iwakata | F16J 15/3252 277/552 |
| 2018/0106373 A1* | 4/2018 | Toth | F16J 15/3232 |
| 2022/0381347 A1 | 12/2022 | Harmeyer et al. | |

FOREIGN PATENT DOCUMENTS

| | | |
|---|---|---|
| CN | 205918897 U | 2/2017 |
| CN | 107725783 A | 2/2018 |
| GB | 2577906 B | 1/2021 |
| JP | 2007-225063 A | 9/2007 |

* cited by examiner

*Primary Examiner* — Vishal A Patel

(57) ABSTRACT

A dynamically vented crankshaft seal and systems and methods thereof can include a seal assembly comprised of a wear sleeve; a main seal; a dust seal; and a plurality of vents circumferentially spaced from each other. Each of the vents can be formed by at least a channel. The channel may be formed in or by the wear sleeve, which can be a primary wear sleeve or a secondary wear sleeve. Further, each of the vents can extend from a first side of the seal assembly to between the main seal and the dust seal. An angle between a channel length axis of the channel and a trajectory of circumferential motion can be ninety degrees, acute, or obtuse for each of the channels.

6 Claims, 8 Drawing Sheets optimized dust
rejection & venting
W = 90° enhanced dust
rejection W > 90° forced air
intake W < 90°

DYNAMICALLY VENTED CRANKSHAFT SEAL AND SYSTEMS AND METHODS THEREOF

TECHNICAL FIELD

The present disclosure pertains to dynamically vented crankshaft seals and systems and methods thereof.

BACKGROUND

Many rotatable shaft mechanisms in machinery such as an engine crankshaft in an engine employ shaft seals to maintain a lubricating oil within the machinery and upon surfaces of rotating components. In an engine crankshaft it is common to employ a front crankshaft seal and a back crankshaft seal. Such seals are commonly installed into the cylinder block such as by press-fitting to form a static seal with the cylinder block, and a dynamic seal about the rotating crankshaft. The dynamic seal portion in such examples typically includes a non-metallic material such as a polytetrafluoroethylene (PTFE) material that contacts an outer rotating surface of the crankshaft or a wear sleeve or the like fitted thereon. Oil within the engine crankcase can migrate between the dynamic seal portions and the crankshaft itself to some degree, assisting in lubrication of the interfacing surfaces.

Crankshaft seals can be susceptible to carbonization of hydrocarbon-based lubricants that leads to contamination of a pumping spiral grooves. The spiral grooves are molded or cut into a contact interface of a main lip of the sealing that can be made of PTFE, as noted above. A rate of the carbonization increases with a speed of the rotating shaft, a radial load on the sealing lip, and a temperature and age of a lubricant fluid. The high load, speed, and temperature can lead to build-up of heat generated by a sliding friction between a static sealing lip and a rotating element. The lubricant can start to burn and form carbon debris as the temperature at the sliding contact interface exceeds a flashpoint of the lubricant. The carbon debris can gradually accumulate in the pumping grooves and degrade pumping capability to a point of causing of external leak. And an increase in frictional heating may be exacerbated by a vacuum formation at junction between the main lip and a dust lip which is essentially designed to prevent ingress of external debris into the main sealing interface. The stability and intensity of a negative pressure at the junction region may depend largely on the design of the dust lip. A high negative pressure can cause starvation of air flow through the main-lip spiral groove that aids in cooling off a contact interface and increase in radial load due to increased bending of the main lip toward the junction.

U.S. Patent Pub. No. 2022/0381347 ("the '347 publication") describes a seal assembly for a rotatable shaft assembly that includes a seal housing and each of a main seal and a dust seal extending circumferentially around a seal housing center axis. The dust seal includes a radially inward dust seal lip, and is formed by a sealing layer having a plurality of ventilation openings formed therein, and a debris-blocking filter layer attached to the sealing layer and positioned across the ventilation openings. According to the '347 publication, the main seal and the dust seal assist in maintaining lubricating oil within a seal cavity, and the dust seal prevents entry of debris whilst ventilating the seal cavity to limit carbonization of oil on seal assembly components.

SUMMARY

According to an aspect of the present disclosure, a seal assembly is disclosed or can be provided or implemented. The seal assembly can comprise: a wear sleeve; a main seal; a dust seal; and a plurality of vents circumferentially spaced from each other, each of the vents being formed by at least a channel. Each of the vents extends from a first side of the seal assembly to between the main seal and the dust seal, and an angle between a channel length axis of the channel and a trajectory of circumferential motion is ninety degrees, acute, or obtuse for each of the channels.

According to another aspect a method is disclosed or can be implemented. The method can comprise: providing a wear sleeve to go around a rotatable shaft; and providing a seal assembly to go around the rotatable shaft. The seal assembly can include: a housing, a main seal mounted to the housing, the main seal including a mounting portion and a main seal lip, and the main seal being curved in a side profile view of the seal assembly, a dust seal having a mounting portion, and a plurality of vents circumferentially spaced from each other about the seal assembly. Each of the vents is formed by a channel, and each of the vents extends from outside the seal assembly to a circumferential seal cavity between the main seal and the dust seal to prevent or minimize vacuum formation in the circumferential seal cavity. An angle between a channel length axis of the channel and a trajectory of circumferential motion of the rotatable shaft is ninety degrees, acute, or obtuse for each of the channels.

According to yet another aspect, a rotatable shaft assembly is disclosed or can be implemented or provided. The rotatable shaft assembly can comprise: a rotatable shaft defining a shaft axis of rotation; a wear sleeve circumscribing the rotatable shaft and being directly mounted on the rotatable shaft; and a seal assembly circumscribing the rotatable shaft. The seal assembly can include: a housing, a main seal mounted to the housing, the main seal including a mounting portion and a main seal lip, and the main seal being curved in a side profile view of the seal assembly, a dust seal having a mounting portion, and a plurality of vents circumferentially spaced from each other about the seal assembly. Each of the vents extends from outside the seal assembly to a circumferential seal cavity between the main seal and the dust seal to prevent or minimize vacuum formation in the circumferential seal cavity.

DETAILED DESCRIPTION

Embodiments of the present disclosure relate to dynamically vented crankshaft seals and systems and methods thereof.

Figure 1:
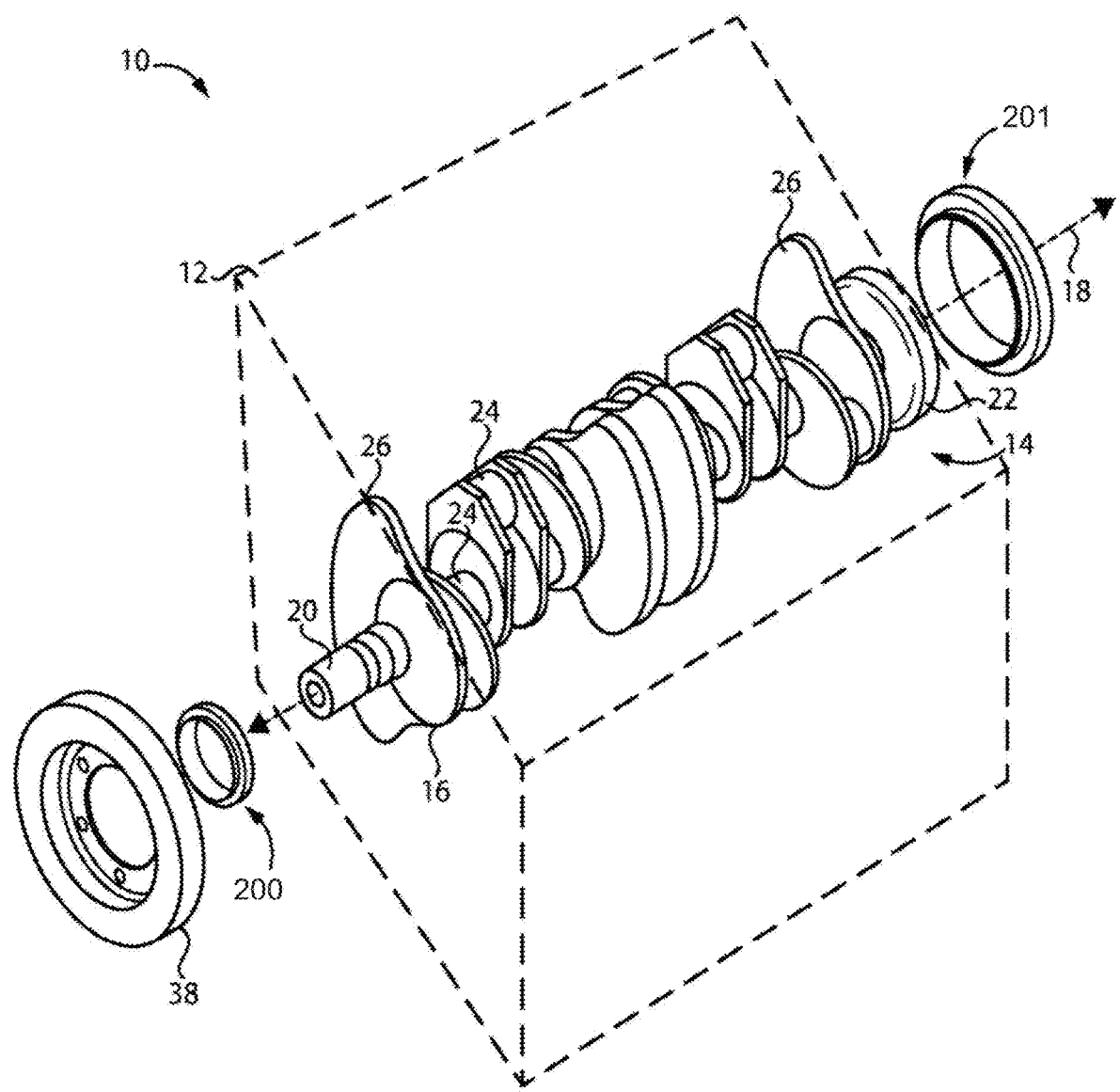
FIG. 1 is a diagrammatic view of a machine system, according to one or more embodiments of the present disclosure.

FIG. 1 shows a machine system 10, according to one or more embodiments of the present disclosure. Machine system 10 can includes a housing 12 (diagrammatically shown), and a rotatable shaft assembly 14 structured to be supported for rotation in housing 12. Machine system 10 may be or include an internal combustion engine system, such as a diesel engine system. Rotatable shaft assembly 14 can include a rotatable shaft 16 defining a shaft axis of rotation 18 extending between a first axial end 20 and a second axial end 22. In the illustrated embodiment, rotatable shaft 16 includes an engine crankshaft, including crank pins 24 and balance weights 26, though embodiments of the present disclosure are not limited to the specific configuration shown in FIG. 1. It will thus be appreciated that rotatable shaft assembly 14 can rotate in the housing 12 during operation to convert linear movement of pistons to torque for any of a great variety of known applications. Rotatable shaft 16 may be equipped with bearing surfaces and supported for rotation with bearing caps or the like according to any suitable construction.

Rotatable shaft assembly 14 can further include a first seal assembly 200 positionable upon the rotatable shaft 16 at first axial end 20, and a second seal assembly 201 positionable upon rotatable shaft 16 at second axial end 22. First seal assembly 200 and second seal assembly 201 may be of identical, similar, or different configurations. For instance, as shown in FIG. 1, the second seal assembly 201 can be greater in diameter and circumference than the first seal assembly 200. A torsional damper 38 may be coupled to first axial end 20 of rotatable shaft 16 adjacent to the first seal assembly 200.

As illustrated, based on positioning relative to the rotatable shaft 16, the first seal assembly 200 can be regarded as a front crankshaft seal and second seal assembly 201 can be regarded as a back crankshaft seal. Discussion and description herein of seal assembly 200 should be understood to refer by way of analogy to features of seal assembly 201 as well as to any of the other various embodiments contemplated herein.

Figure 2:
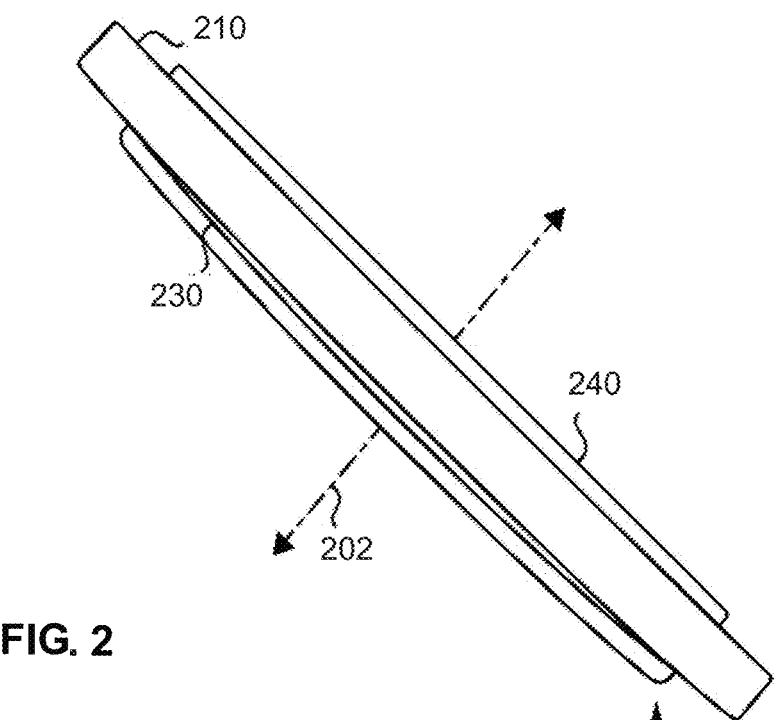
FIG. 2 is an elevational view of a seal assembly, according to one or more embodiments of the present disclosure.
Figure 3:
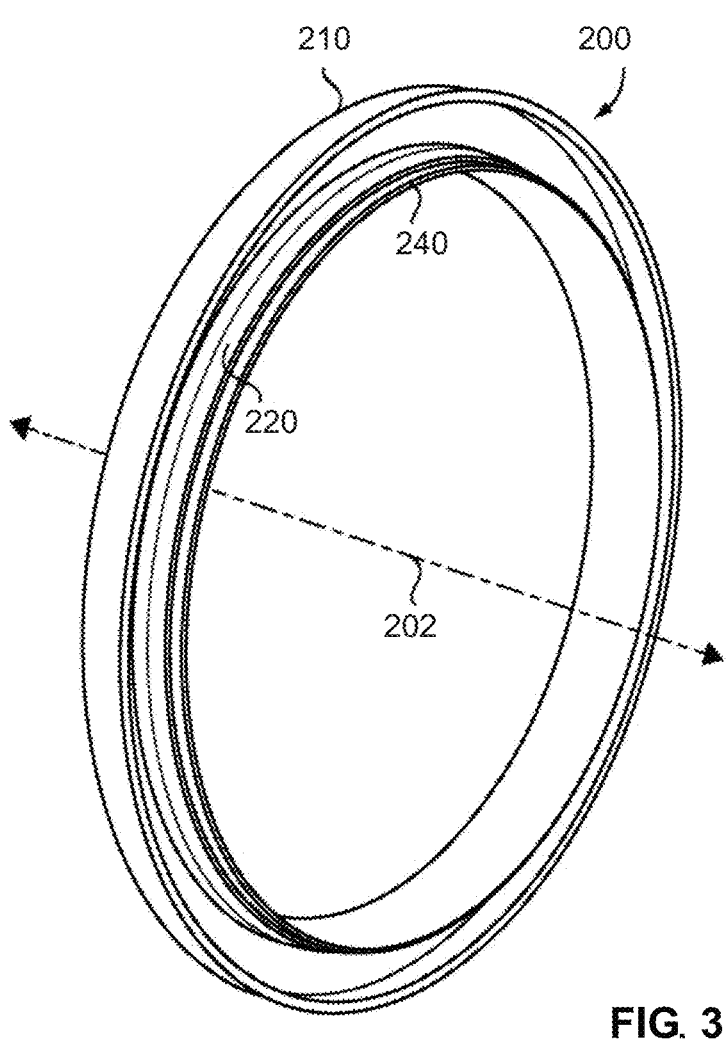
FIG. 3 is a diagrammatic view of a seal assembly, as in FIG. 2.

Referring also now to FIG. 2 and FIG. 3, the seal assembly 200 can include a seal housing 210, a main seal 220, and a dust seal 230. Each of the seal housing 210, the main seal 220, and dust seal 230 can extend circumferentially around shaft axis of rotation 18 (from FIG. 1). Seal housing 210 can further be understood to define a seal center axis 202, with each of the seal housing 210, the main seal 220, and the dust seal 230 extending circumferentially around seal center axis 202. In an implementation, the seal housing 210 can be formed of a metallic material, such as steel, the main seal 220 may be formed of a polymeric material such as a PTFE material, and/or the dust seal 230 may have a layered structure in some embodiments with the layers formed of non-metallic materials, as further discussed herein.

A wear sleeve 240, which can rotate with the rotatable shaft 16, can extend through seal assembly 200 and can be positioned radially between the main seal 220 and the rotatable shaft 16 and radially between the dust seal 230 and the rotatable shaft 16. The wear sleeve 240 may be regarded as a primary sleeve. The wear sleeve 240 can extend around the entire circumference of the rotatable shaft 16. The wear sleeve 420 can be formed of a suitable metallic material, such as steel, and can be interference-fitted upon the rotatable shaft 16. Further, seal housing 210 may be interference-fitted within the housing 12, such as a cylinder block, in the machine system 10. A static seal may thus be formed between the seal housing 210 and the housing 12, and a dynamic seal can be formed between the main seal 220 and the wear sleeve 240, which, as noted above, can rotate with the rotatable shaft 16.

Figure 4:
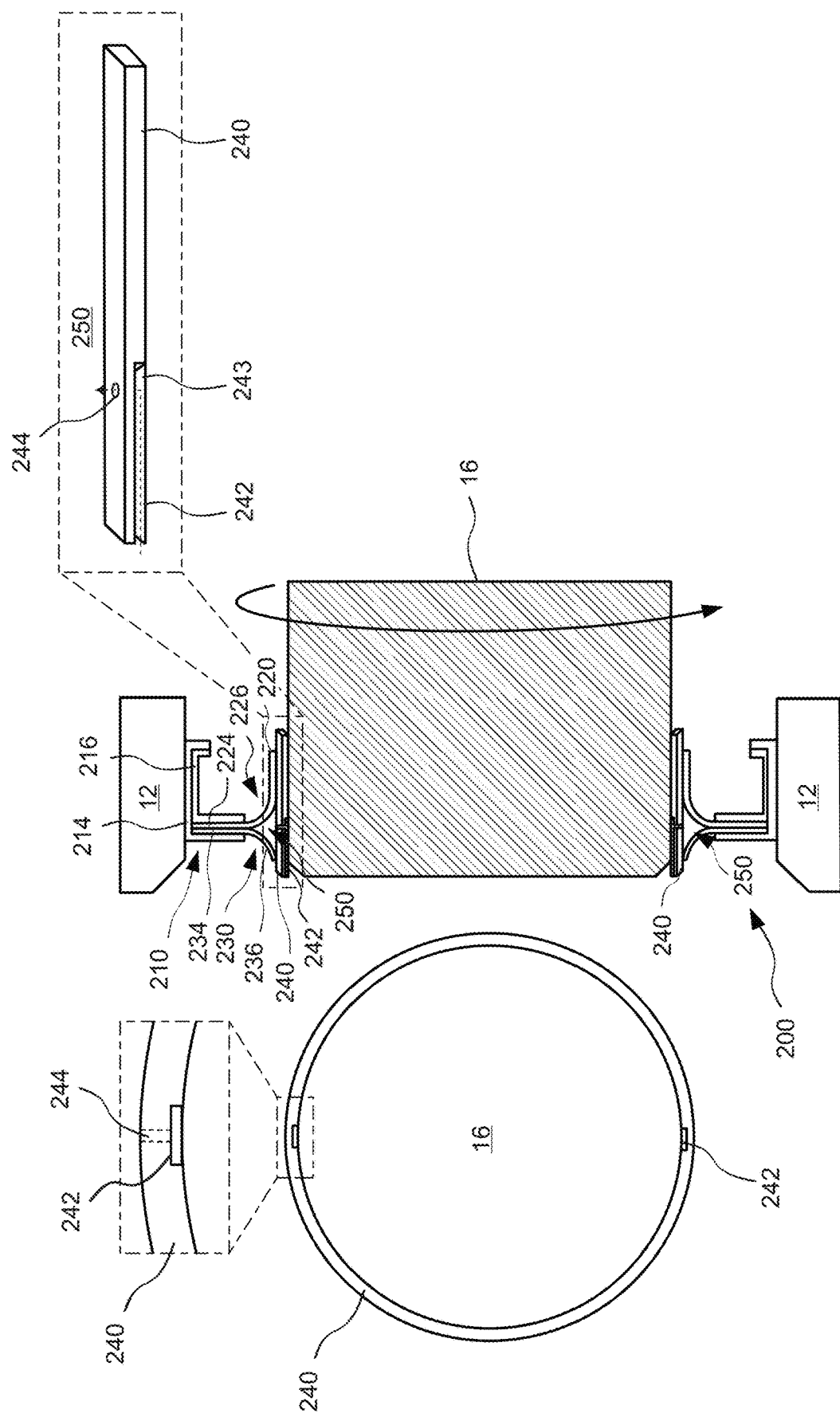
FIG. 4 shows front and side sectional views of a crankshaft seal according to one or more embodiments of the present disclosure.

Turning now to FIG. 4, the main seal 220 can include a radially outward mounting portion 224 coupled to seal housing 210, and a radially inward main seal lip 226. Main seal lip 226 can be thickened relative to other parts of main seal 220 in some embodiments, though the present disclosure is not thereby limited. Radially inward main seal lip 226 may also form a terminal end or inner peripheral edge of the main seal 220. Radially outward mounting portion 224 may form an outer peripheral edge of the main seal 220.

The main seal 220 can be deformed between the seal housing 210 and the wear sleeve 240. As shown in FIG. 4, the main seal 220 can be curved in axial profile such that radially inward main seal lip 226 is positioned to seal about the wear sleeve 240 at a first axial location spaced from radially outward mounting portion 224. The main seal 220 may have at least some internal elastic resiliency, such that when unbiased the main seal 220 can have a tendency to assume a planar form or a form closer to planar than what is depicted in the drawings. Deformation of the main seal 220 against an internal bias can assist in maintaining a radially inward squeeze about the wear sleeve 240.

As noted above, the main seal 220 can be curved in axial profile, relative to seal center axis 202 and shaft axis of rotation 18, which may be colinear. As used herein, "axial" can refer to directions along axes 202 and 18, and "radial" can refer to directions normal to axes 202 and 18. The wear sleeve 240 can have an axial or side profile that is straight, for instance, rectangular. In the illustrated embodiment, the main seal 220 can be deformed between the seal housing 210 and the wear sleeve 240 so as to project from seal housing 210 in a first axial direction. The dust seal 230 may be deformed between the seal housing 210 and the wear sleeve 240 so as to project from the seal housing 210 in a second axial direction opposite to the first axial direction. Incidentally, in FIG. 4, the down-going curved arrow around the rotatable shaft indicates a representative direction of rotation.

The dust seal 230 can include a radially outward mounting portion 234 coupled to the seal housing 210, and a radially inward dust seal lip 236 positioned to seal about the wear sleeve 240 at a second axial location. It can thus be seen that a spacing distance can extend axially between sealing locations of the radially inward main seal lip 226 and the radially inward dust seal lip 236. It can also be seen that a circumferential seal cavity 250 can extend between the main seal 220, the dust seal 230, and the wear sleeve 240, in particular being defined by the main seal 220, the dust seal 230, and the wear sleeve 240 in the illustrated embodiment. The dust seal 230 can be shorter in length than the main seal 220. For instance, the radially inward dust seal lip 236 can be shorter in length than the radially inward main seal lip 226.

Also in the illustrated embodiment, the seal housing 210 can include an outer housing portion 214 and an inner housing portion 216 mated with outer housing portion 214. The outer housing portion 214 and the inner housing portion 216 may be separate components. The outer housing portion 214 can form an L-shape in cross-section. Likewise, the inner housing portion 216 can form an L-shape in cross-section. A portion of the inner housing portion 216 may be interference-fitted with a portion of the outer housing portion 214, such as shown in FIG. 4. The main seal 220 and the dust seal 230 may be fixed (e.g., clamped, friction fit, adhered, etc.) between the outer housing portion 214 and the inner housing portion 216, such as shown in FIG. 4. That is, the radially outward mounting portion 224 of the main seal 220 and the radially outward mounting portion 234 of the dust seal 230 can be between (e.g., clamped, friction fit, adhered, etc.) the outer housing portion 214 and the inner housing portion 216, such as shown in FIG. 4.

Still referring to FIG. 4, the wear sleeve 240 can include at least one channel 242. In the illustrated embodiment, the wear sleeve 240 includes two channels 242, though embodiments of the present disclosure are not so limited. For instance, the wear sleeve 240 can include three channels 242 or four channels 242. The channels 242 may be evenly spaced about the circumference of the wear sleeve 240. As an example, in the case of two channels 242, the channels 242 can be spaced 180 degrees from each other, for instance, at the top and at the bottom of the wear sleeve 240, such as shown in FIG. 4.

An opening or hole 244 can be at a second end portion of the channel 242 opposite the end or edge of the channel 242 and can extend from the second end portion of the channel 242 to the circumferential seal cavity 250, such as shown in FIG. 4. According to one or more embodiments, the opening 244 can extend radially outward from the channel 242, i.e., at a ninety-degree angle. Here, the opening 244 can be the only opening extending from the channel 242 to the circumferential seal cavity 250. The channel 242 can have a cross-section greater than the cross-section of the opening 244, one or both of which may be uniform. For example, as shown in the end or front view in FIG. 4, the width of the channel 242, which can be rectangular in the end/front view, can be greater than the width of the opening 244, which can also be rectangular in the end/front view (but having a length oriented ninety degrees offset relative to the width of the channel 242).

Optionally, the channel 242 can have a stub 243 at the second end portion thereof. Here, the stub 243 can extend past the opening 244 in the axial direction. Thus, in the event outside material (e.g., dust) enters the channel 242, the outside material can overshoot the opening 244 into the stub 243 and be prevented or minimized from entering the opening 244.

Still referring to FIG. 4, top, bottom, sides, and the end of each channel 242 can be defined by respective walls of the wear sleeve 240. Further, each channel 242 can extend from an end or edge of the wear sleeve 240 and can terminate along the length of the wear sleeve 240. The originating edge of the channel 242 can face outward in the axial direction, for instance, to the surrounding environment of the rotatable shaft assembly 14 or portion thereof, such as the housing 12. As shown in FIG. 4, the channel 242 can terminate aligned with the circumferential seal cavity 250 in the radially outward direction. According to one or more embodiments, at least the opening 244 can be aligned with the circumferential seal cavity 250 in the radially outward direction. Optionally, the terminal end of the stub 243, which can define a terminal end of the channel 242, can overlap the circumferential seal cavity 250 in the radially outward direction.

The channel 242 and the opening 244 may be referred to or regarded as a vent. Thus, the wear sleeve 240, which as noted above can be regarded as a primary wear sleeve, can include or contain a plurality of vents, in this embodiment, each in the form of the channel 242 and the opening 244. During operation of the machine 10, particularly the rotation of the rotatable shaft 16, for instance, at relatively high speeds, air can pass through the channel 242 and the opening 244, entering through the entrance of the channel 242, which may be axial outward of the radially inward dust seal lip 236 of the dust seal 230, and exiting from the opening 244, into the circumferential seal cavity 250, such as shown by the arrow in the enlarged view portion of FIG. 4. Thus, the vent may be regarded as extending from the circumferential seal cavity 250 to outside the seal assembly 200, i.e., external to at least the seal assembly 200 and the rotatable shaft 16. Such vent formed by the channel 242 and the opening 244 can prevent or minimize vacuum formation at a junction between the main seal 220 and the dust seal 230, i.e., within the circumferential seal cavity 250. That is, the venting effect created by the channel 242 and the opening 244 can prevent or minimize the formation of or likelihood of formation of a vacuum at the junction between the main seal 220 and the dust seal 230, i.e., within the circumferential seal cavity 250.

Figure 5:
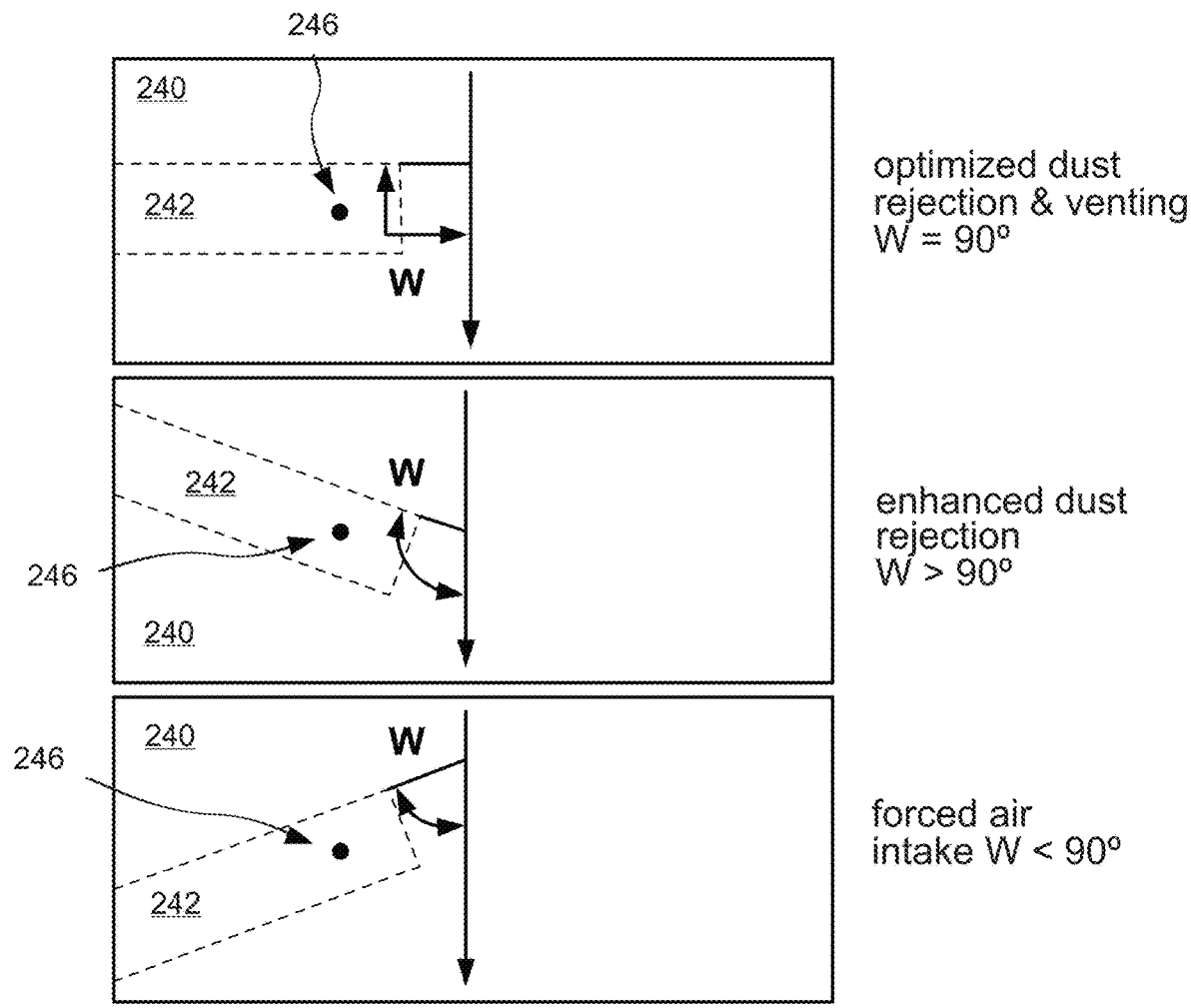
FIG. 5 shows orientation angles for a venting channel of the crankshaft seal of FIG. 4.

Referring now to FIG. 5, it is noted that the orientation of the channel 242 can be set to control the rate of air inflow into the channel 242 and thus the vent formed by the channel 242 and the opening 244. In FIG. 5, the down-going arrow represents the rotational direction of the rotatable shaft 16. Here, the top box represents a configuration whereby the channel 242 is oriented perpendicular to the direction of rotation of the rotatable shaft 16, i.e., angle of obliqueness W equals ninety degrees; the middle box represents a configuration whereby the channel 242 is oriented with angle W greater than ninety degrees (e.g., 110 degrees or 120 degrees); and the bottom box represents a configuration whereby the channel 242 is oriented with angle W less than ninety degrees (e.g., 70 degrees or 80 degrees). Put another way, the angle W between a channel length axis of the channel 242 and a trajectory of circumferential motion of the rotatable shaft 16 is ninety degrees in the top box; the angle W between the channel length axis of the channel 242 and a trajectory of circumferential motion of the rotatable shaft 16 is greater than ninety degrees (e.g., 110 degrees or 120 degrees) in the middle box; and the angle W between the channel length axis of the channel 242 and a trajectory of circumferential motion of the rotatable shaft 16 is less than ninety degrees (e.g., 70 degrees or 80 degrees) in the bottom box. In the case of the top box, the configuration can provide both dust rejection and venting capabilities (e.g., both optimized), whereas the middle and bottom boxes can provide enhanced dust rejection and enhanced forced air intake, respectively. Put more generally, more obliqueness can provide more dust rejection or air intake, depending upon the direction of obliqueness. The opening 244 can be centered in a width direction of the channel 242, such as shown in the overhead views of FIG. 5.

Figure 6:
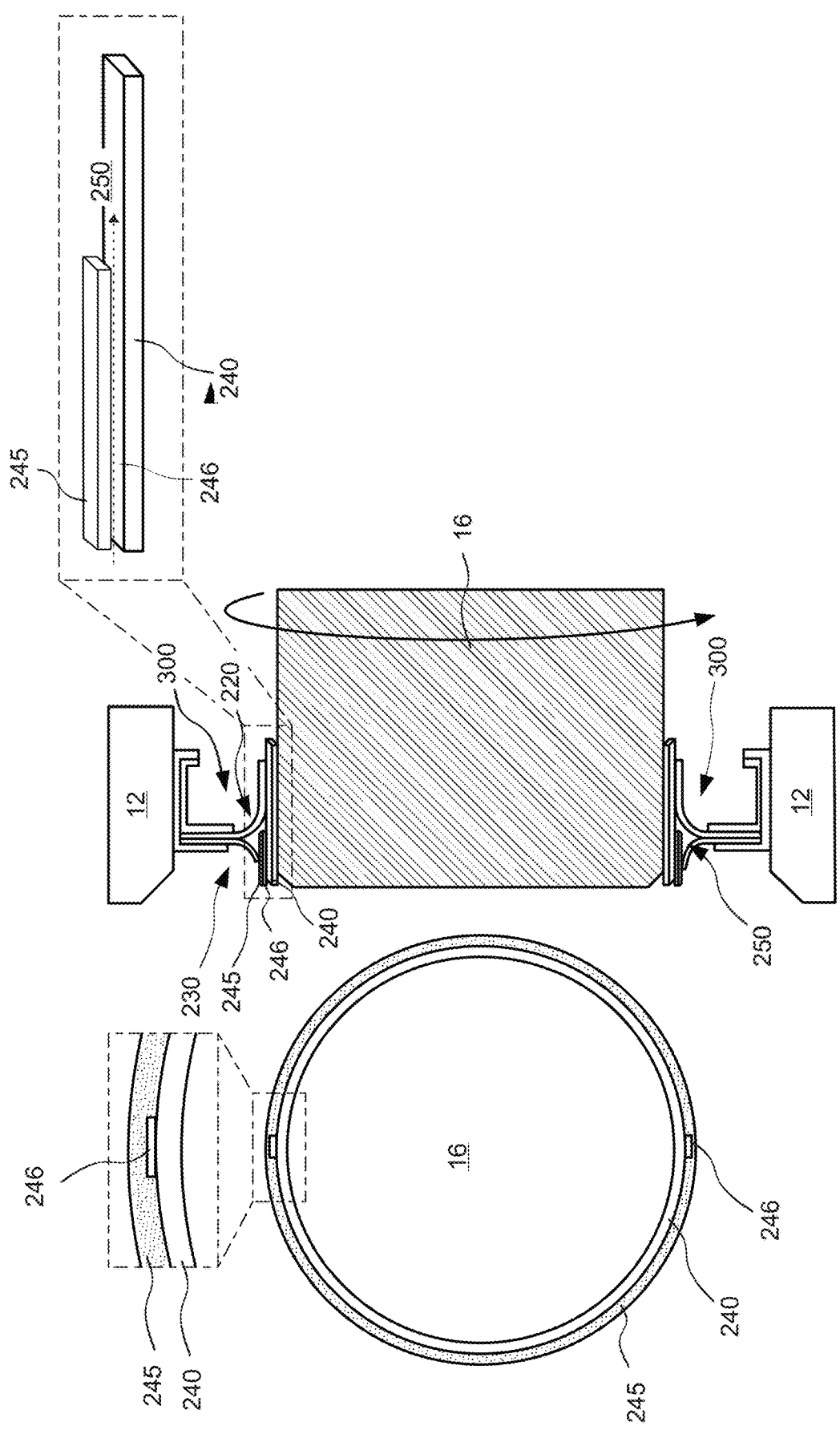
FIG. 6 shows front and side sectional views of a crankshaft seal according to one or more embodiments of the present disclosure.

Turning now to FIG. 6, FIG. 6 shows another seal assembly 300 according to one or more embodiments of the present disclosure. Notably, rather than the channel 242 and the opening 246 forming a vent, a channel 246 can be implemented. Here, the channel 246 can be formed fully or partially in an auxiliary sleeve 245 circumscribing the wear sleeve 240 (which, as noted above, can be regarded as a primary wear sleeve). According to one or more embodiments, the channel 246 can be formed wholly by the auxiliary sleeve 245. That is, the top, bottom, and sides of each channel 246 can be defined by respective walls of the auxiliary sleeve 245. Alternatively, the wear sleeve 240 outer diameter can define the bottom or floor of each channel 246.

The dust seal 230 can be shorter in length than the main seal 220. For instance, the radially inward dust seal lip 236 can be shorter in length than the radially inward main seal lip 226. Further, in light of the auxiliary sleeve 245 on the outer surface of the wear sleeve 240, the dust seal 230 can be shorter than the dust seal 230 in the seal assembly 200 in the embodiment of FIG. 4 discussed above. That is, the radially inward dust seal lip 236 of the seal assembly 300 in the embodiment of FIG. 6 can be shorter than the radially inward dust seal lip 236 of the seal assembly 300 of the embodiment of FIG. 4.

In the illustrated embodiment, two channels 246 are implemented, though embodiments of the present disclosure are not so limited. For instance, three channels 246 or four channels 246 can be implemented. The channels 246 may be evenly spaced about the circumference of the auxiliary sleeve 245. As an example, in the case of two channels 246, the channels 246 can be spaced 180 degrees from each other, for instance, at the top and at the bottom of the auxiliary sleeve 245, such as shown in FIG. 6.

As shown in the end or front view in FIG. 6, the channel 246 can be rectangular in the end or front view. Also shown in FIG. 6, the channel 246 can extend straight from the surrounding environment of the rotatable shaft assembly 14 or portion thereof, such as the housing 12, to the circumferential seal cavity 250. The wear sleeve 240 can have an axial or side profile that is straight, for instance, rectangular. And the main seal 220 and the dust seal 230 can be curved in axial profile.

As noted above, the channel 246 may be referred to or regarded as a vent. Thus, during operation of the machine 10, particularly the rotation of the rotatable shaft 16, for instance, at relatively high speeds, air can pass through the channel 246, entering through the entrance of the channel 246, which may be axial outward of the radially inward dust seal lip 236 of the dust seal 230, and exiting from the channel 246 into the circumferential seal cavity 250, such as shown by the arrow in the enlarged view portion of FIG. 6. Thus, the vent may be regarded as extending from the circumferential seal cavity 250 to outside the seal assembly 200, i.e., external to at least the seal assembly 200 and the rotatable shaft 16. Such vent formed by the channel 246 can prevent or minimize vacuum formation at a junction between the main seal 220 and the dust seal 230, i.e., within the circumferential seal cavity 250. That is, the venting effect created by the channel 246 can prevent or minimize the likelihood of formation of a vacuum at the junction between the main seal 220 and the dust seal 230, i.e., within the circumferential seal cavity 250.

Figure 7:
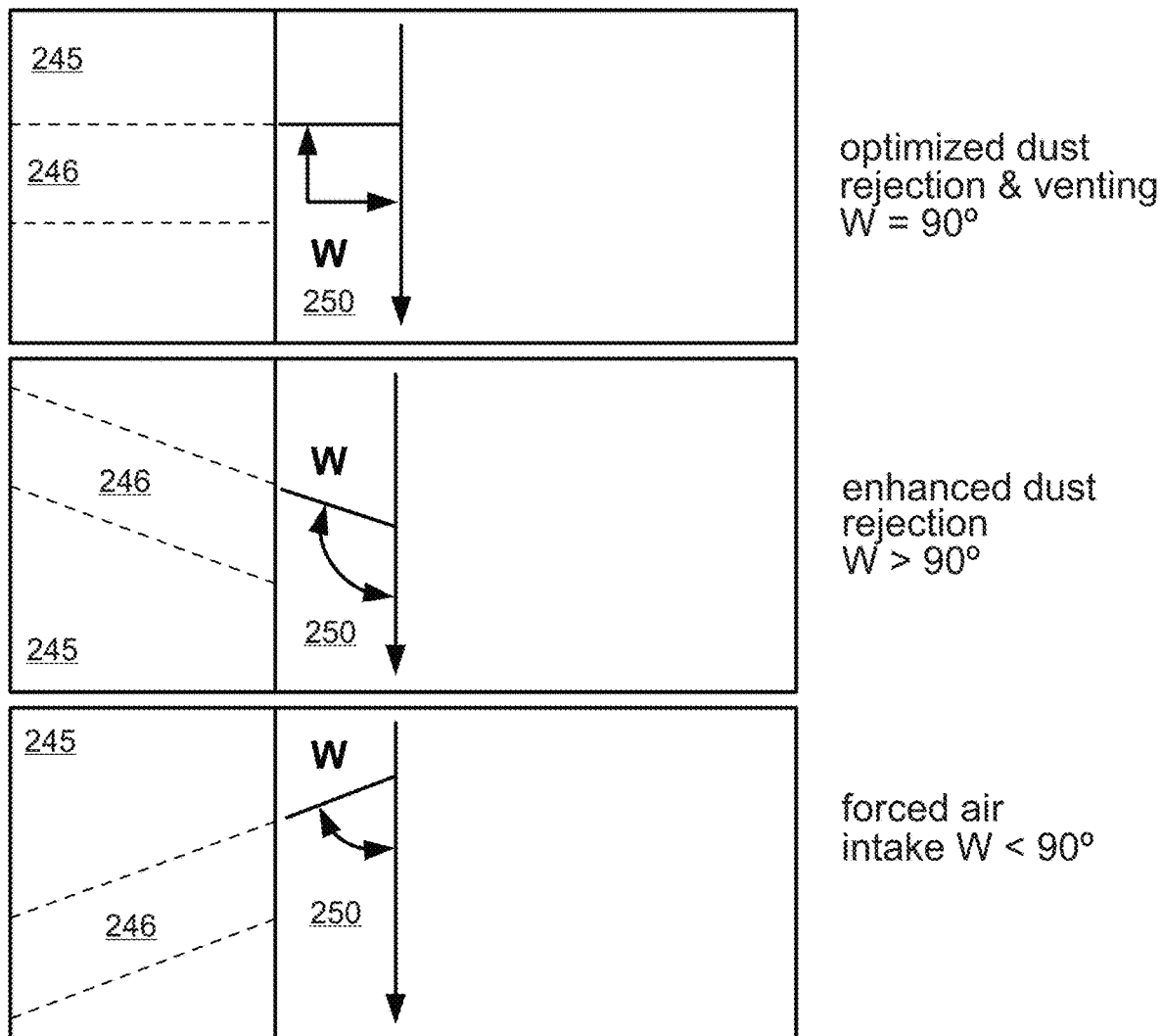
FIG. 7 shows orientation angles for a venting channel of the crankshaft seal of FIG. 6.

Referring now to FIG. 7, it is noted that the orientation of the channel 246 can be set to control the rate of air inflow into the channel 246. In FIG. 7, the down-going arrow represents the rotational direction of the rotatable shaft 16. Here, the top box represents a configuration whereby the channel 246 is oriented perpendicular to the direction of rotation of the rotatable shaft 16, i.e., angle of obliqueness W equals ninety degrees; the middle box represents a configuration whereby the channel 246 is oriented with angle W greater than ninety degrees (e.g., 110 degrees or 120 degrees); and the bottom box represents a configuration whereby the channel 246 is oriented with angle W less than ninety degrees (e.g., 70 degrees or 80 degrees). Put another way, the angle W between a channel length axis of the channel 246 and a trajectory of circumferential motion of the rotatable shaft 16 is ninety degrees in the top box; the angle W between the channel length axis of the channel 246 and a trajectory of circumferential motion of the rotatable shaft 16 is greater than ninety degrees (e.g., 110 degrees or 120 degrees) in the middle box; and the angle W between the channel length axis of the channel 246 and a trajectory of circumferential motion of the rotatable shaft 16 is less than ninety degrees (e.g., 70 degrees or 80 degrees) in the bottom box. In the case of the top box, the configuration can provide both dust rejection and venting capabilities (e.g., both optimized), whereas the middle and bottom boxes can provide enhanced dust rejection and enhanced forced air intake, respectively. More generally, more obliqueness can provide more dust rejection or air intake, depending upon the direction of obliqueness.

Figure 8:
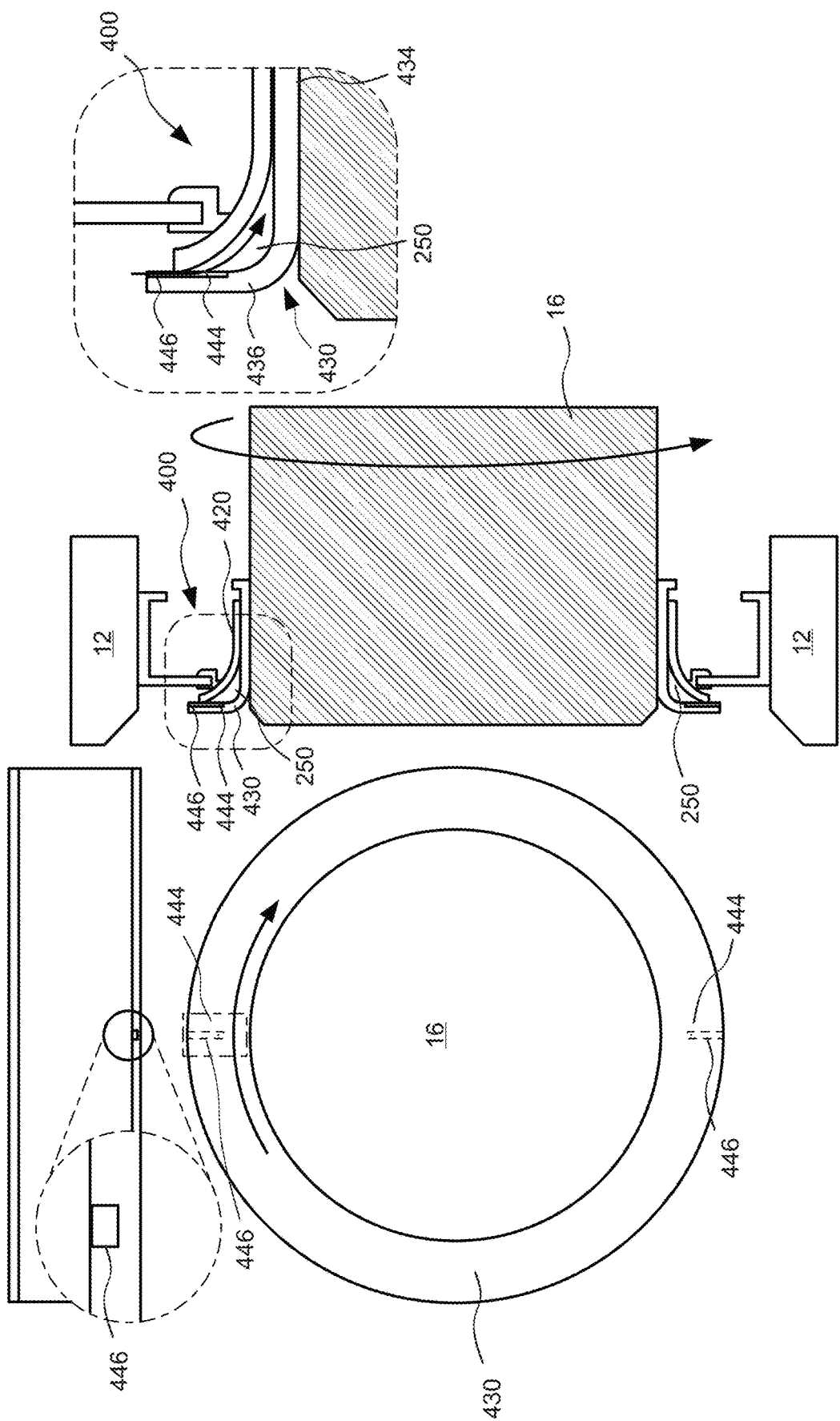
FIG. 8 shows front and side sectional views of a crankshaft seal according to one or more embodiments of the present disclosure.

Turning now to FIG. 8, FIG. 8 shows another seal assembly 400 according to one or more embodiments of the present disclosure. Notably, instead of a purely cylindrical wear sleeve, the seal assembly 400 can have a wear sleeve 430 that has a curved axial longitudinal profile. For instance, FIG. 8 shows the wear sleeve 430 being curved to form a J-shape (in the side or profile view). Here, the wear sleeve 430 can have a radially inward mounting portion 434 to mount the wear sleeve 430 to the rotatable shaft 16 and a radially outward dust seal lip 436 that can provide axial loading against the curved portion of the main seal 420. The seal assembly 400 can also have a main seal 420, which can also be curved, and which can be nested in the wear sleeve 430, such as shown in FIG. 8. In this embodiment, the wear sleeve 430 can be operative or functional as a dust seal for dust protection.

The wear sleeve 430 can also include a channel 446. In the illustrated embodiment, the wear sleeve 430 includes two channels 446, though embodiments of the present disclosure are not so limited. For instance, the wear sleeve 430 can include three channels 446 or four channels 446. The channels 446 may be evenly spaced about the circumference of the wear sleeve 430. As an example, in the case of two channels 446, the channels 446 can be spaced 180 degrees from each other, for instance, at the top and at the bottom of the wear sleeve 430, such as shown in FIG. 8.

An opening or hole 444 can be at a second end portion of the channel 446 opposite the end or edge of the channel 446 and can extend from the second end portion of the channel 446 to the circumferential seal cavity 250, such as shown in FIG. 8. According to one or more embodiments, the opening 444 can extend radially outward from the channel 446, i.e., at a ninety-degree angle. Here, the opening 444 can be the only opening extending from the channel 446 to the circumferential seal cavity 250. Optionally, the channel 446 can have a stub at the second end portion thereof. The stub can extend past the opening 444 in the radial direction. Thus, in the event outside material (e.g., dust) enters the channel 446, the outside material can overshoot the opening 444 into the stub and be prevented or minimized from entering the opening 444.

Still referring to FIG. 8, top, bottom, sides, and the end of each channel 446 can be defined by respective walls of the wear sleeve 430. Further, each channel 446 can extend from an end or edge of the wear sleeve 430 and can terminate along the length of the wear sleeve 430. The originating edge of the channel 446 can face outward in the radial direction, for instance, to the surrounding environment of the rotatable shaft assembly 14 or portion thereof, such as the housing 12. As shown in FIG. 8, the channel 446 can terminate aligned with the circumferential seal cavity 250 in the axial direction. According to one or more embodiments, at least the opening 444 can be aligned with the circumferential seal cavity 250 in the axial direction. Optionally, the terminal end of the stub, which can define a terminal end of the channel 446, can overlap the circumferential seal cavity 250 in the axial direction.

The channel 446 and the opening 444 may be referred to or regarded as a vent. Thus, the wear sleeve 430, which can be regarded as a primary wear sleeve, can include or contain a plurality of vents, in this embodiment, each in the form of the channel 446 and the opening 444. During operation of the machine 10, particularly the rotation of the rotatable shaft 16, for instance, at relatively high speeds, air can pass through the channel 446 and the opening 444, entering through the entrance of the channel 446, and exiting from the opening 444, into the circumferential seal cavity 250, such as shown by the arrow in the enlarged view portion of FIG. 8. Thus, the vent may be regarded as extending from the circumferential seal cavity 250 to outside the seal assembly 400, i.e., external to at least the seal assembly 400 and the rotatable shaft 16. Such vent formed by the channel 446 and the opening 444 can prevent or minimize vacuum formation at a junction between the wear sleeve 430 and the main seal 420, i.e., within the circumferential seal cavity 250. That is, the venting effect created by the channel 446 and the opening 444 can prevent or minimize the formation of or likelihood of formation of a vacuum at the junction between the main seal 420 and the wear sleeve 430, i.e., within the circumferential seal cavity 250. Thus, the channel 446 introduced in the wear sleeve 430 can be such that the channel 446 is in direct contact with the dust lip, in this case, the wear sleeve 430 also acting as the dust lip. As such, in addition to preventing or minimizing vacuum formation at the junction between the wear sleeve 430 and the main seal 420, the wear sleeve 430 can also act as a dust lip and provide dust protection.

Figure 9:
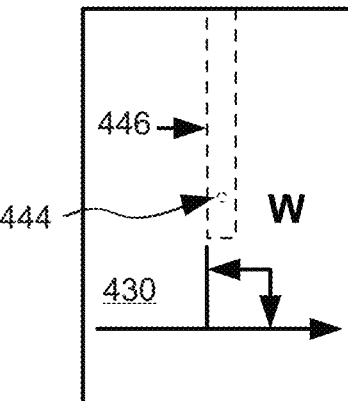
FIG. 9 shows orientation angles for a venting channel of the crankshaft seal of FIG. 8.
Figure 9:
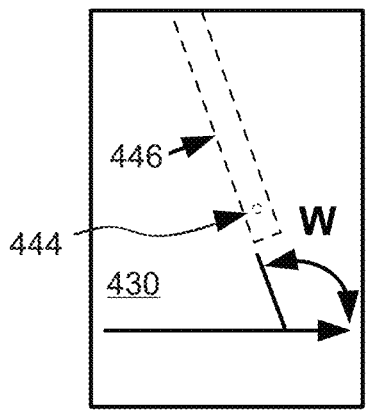
Figure 9:
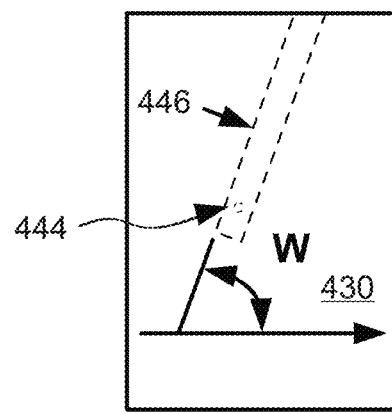

Referring now to FIG. 9, it is noted that the orientation of the channel 446 can be set to control the rate of air inflow into the channel 446 and thus the vent formed by the channel 446 and the opening 444. In FIG. 5, the right-going arrow represents the rotational direction of the rotatable shaft 16. Here, the top box represents a configuration whereby the channel 446 is oriented perpendicular to the direction of rotation of the rotatable shaft 16, i.e., angle of obliqueness W equals ninety degrees; the middle box represents a configuration whereby the channel 446 is oriented with angle W greater than ninety degrees (e.g., 110 degrees or 120 degrees); and the bottom box represents a configuration whereby the channel 446 is oriented with angle W less than ninety degrees (e.g., 70 degrees or 80 degrees). Put another way, the angle W between a channel length axis of the channel 446 and a trajectory of circumferential motion of the rotatable shaft 16 is ninety degrees in the top box; the angle W between the channel length axis of the channel 446 and a trajectory of circumferential motion of the rotatable shaft 16 is greater than ninety degrees (e.g., 110 degrees or 120 degrees) in the middle box; and the angle W between the channel length axis of the channel 466 and a trajectory of circumferential motion of the rotatable shaft 16 is less than ninety degrees (e.g., 70 degrees or 80 degrees) in the bottom box. In the case of the top box, the configuration can provide both dust rejection and venting capabilities (e.g., both optimized), whereas the middle and bottom boxes can provide enhanced dust rejection and enhanced forced air intake, respectively. Put more generally, more obliqueness can provide more dust rejection or air intake, depending upon the direction of obliqueness. The opening 444 can be centered in a width direction of the channel 446, such as shown in the overhead views of FIG. 9.

INDUSTRIAL APPLICABILITY

As noted above, embodiments of the present disclosure involve dynamically vented crankshaft seals and systems and methods thereof.

As noted above, crankshaft seals can be susceptible to carbonization of hydrocarbon-based lubricants that leads to contamination of a pumping spiral grooves, which can be molded or cut into a contact interface of a main lip of the sealing that can be made of PTFE. A rate of the carbonization increases with a speed of the rotating shaft, a radial load on the sealing lip, and a temperature and age of a lubricant fluid. The high load, speed, and temperature can lead to build-up of heat generated by a sliding friction between a static sealing lip and a rotating element. The lubricant can start to burn and form carbon debris as the temperature at the sliding contact interface exceeds a flashpoint of the lubricant. The carbon debris can gradually accumulate in the pumping grooves and degrade pumping capability to a point of causing of external leak. And an increase in frictional heating may be exacerbated by a vacuum formation at junction between the main lip and a dust lip which is essentially designed to prevent ingress of external debris into the main sealing interface. The stability and intensity of a negative pressure at the junction region may depend largely on the design of the dust lip. A high negative pressure can cause starvation of air flow through the main-lip spiral groove that aids in cooling off a contact interface and increase in radial load due to increased bending of the main lip toward the junction.

In view of the foregoing, seal assemblies according to embodiments of the present disclosure, such as seal assembly 200, seal assembly 201, seal assembly 300, and seal assembly 400, can be uniquely structured for lubrication and sealing about rotatable shaft 16 and exclusion of debris, as well as for preventing or minimizing vacuum formation between a main lip and a dust lip of the seal assembly. Notably, seal assemblies can implement a vent (or multiple vents) to prevent or minimize vacuum formation between the main lip and the dust lip of the seal assembly.

Thus, embodiments of the present disclosure can implement a dynamically vented crankshaft seal. The dynamic venting can include air passages, for instance, in the rotating wear sleeve, which can primarily relieve negative pressure formation in a junction region. The above-discussed channels 242/openings 244 for seal assembly 200, channels 242 for seal assembly 300, and channels 446/openings 44 for seal assembly 400 each can be representative of such an air passage for venting.

A rapid angular motion of the air passages can prevent or minimize dust ingestion. The air passages can contain an elongated channel with an open side facing toward an ID (inner diameter) surface of a sleeve for a crankshaft seal with both a dust and main lips radially in contact to the wear sleeve OD (outer sleeve). According to one or more embodiments, the channel, for instance, channel 242, can extend axially from an air-facing edge of the sleeve to location of the junction region. In such embodiment, a thru-hole, for instance, opening 244, can radially connect the channel to the junction space. A variation can be to inscribe centripetally facing channels in an auxiliary sleeve mounted pressed fit on the wear sleeve, such as described above for the seal assembly 300.

A length of the channel can equal an axial width of the auxiliary sleeve mounted such that the channels engage only the dust lip without touching the sealing main lip. The open side of the channel can face toward an engine. Further, the channel that is contained in the engine-facing side of the sleeve flange can be in contact with the dust lip. The channels can extend lengthwise from an outer edge of the flange toward the junction region that can be past a contact line with the dust lip. An angle (w) between the channel length axis and a trajectory of circumferential motion may be varied with an eye toward adjusting air intake and dust rejection. When the channel is oriented perpendicular to the direction of rotation of the rotatable shaft 16, i.e., angle of obliqueness W equals ninety degrees, the configuration can provide both dust rejection and venting capabilities (e.g., both optimized); when the channel is oriented with angle W greater than ninety degrees (e.g., 110 degrees or 120 degrees), the configuration can provide enhanced dust rejection; and when the channel is oriented with angle W less than ninety degrees (e.g., 70 degrees or 80 degrees), the configuration can provide enhanced forced air intake. According to one or more embodiments, the orientations of all of the channels per seal assembly can be the same. Alternatively, the orientation of at least one of the channels may be different from orientations of one or more other channels.

Embodiments of the disclosed subject matter can also be as set forth according to the following parentheticals.

(1) A rotatable shaft assembly comprising: a rotatable shaft defining a shaft axis of rotation; a wear sleeve circumscribing the rotatable shaft and being directly mounted on the rotatable shaft; and a seal assembly circumscribing the rotatable shaft, wherein the seal assembly includes: a housing, a main seal mounted to the housing, the main seal including a mounting portion and a main seal lip, and the main seal being curved in a side profile view of the seal assembly, a dust seal having a mounting portion, and a plurality of vents circumferentially spaced from each other about the seal assembly, and wherein each of the vents extends from outside the seal assembly to a circumferential seal cavity between the main seal and the dust seal to prevent or minimize vacuum formation in the circumferential seal cavity.

(2) The rotatable shaft assembly according to (1), wherein the wear sleeve includes a channel and an opening leading from the channel to the circumferential seal cavity as each of the vents.

(3) The rotatable shaft assembly according to (1) or (2), wherein the opening extends from the channel at ninety degrees for each of the vents.

(4) The rotatable shaft assembly according to any one of (1) to (3), wherein an angle between a channel length axis and a trajectory of circumferential motion is ninety degrees.

(5) The rotatable shaft assembly according to any one of (1) to (4), wherein an angle between a channel length axis and a trajectory of circumferential motion is acute or obtuse.

(6) The rotatable shaft assembly according to any one of (1) to (5), wherein the wear sleeve is planar in a longitudinal side profile view of the seal assembly or purely cylindrical in the side profile view of the seal assembly.

(7) The rotatable shaft assembly according to any one of (1) to (6), wherein the wear sleeve is curved in a longitudinal side profile view of the seal assembly.

(8) The rotatable shaft assembly according to any one of (1) to (7), wherein the wear sleeve is the dust seal.

(9) The rotatable shaft assembly according to any one of (1) to (8), wherein the vents are formed entirely in or by the wear sleeve.

(10) The rotatable shaft assembly according to any one of (1) to (9), further comprising an auxiliary sleeve circumscribing the wear sleeve, wherein the vents are formed in or by the auxiliary sleeve.

(11) A method comprising: providing a wear sleeve to go around a rotatable shaft; and providing a seal assembly to go around the rotatable shaft, wherein the seal assembly includes: a housing, a main seal mounted to the housing, the main seal including a mounting portion and a main seal lip, and the main seal being curved in a side profile view of the seal assembly, a dust seal having a mounting portion, and a plurality of vents circumferentially spaced from each other about the seal assembly, wherein each of the vents is formed by a channel, wherein each of the vents extends from outside the seal assembly to a circumferential seal cavity between the main seal and the dust seal to prevent or minimize vacuum formation in the circumferential seal cavity, and wherein an angle between a channel length axis of the channel and a trajectory of circumferential motion of the rotatable shaft is ninety degrees, acute, or obtuse for each of the channels.

(12) The method according to (11), further comprising controlling the rotatable shaft to rotate according to the trajectory of circumferential motion, wherein rotation of the rotatable shaft causes air to pass through the plurality of vents.

(13) The method according to (11) or (12), wherein the wear sleeve is the dust seal and the wear sleeve is part of the seal assembly.

(14) The method according to any one of (11) to (13), wherein the vents are formed entirely in the wear sleeve.

(15) The rotatable shaft assembly according to any one of (11) to (14), further comprising providing an auxiliary sleeve to circumscribe the wear sleeve, wherein the vents are formed entirely in or by the auxiliary sleeve.

(16) A seal assembly comprising: a wear sleeve; a main seal; a dust seal; and a plurality of vents circumferentially spaced from each other, each of the vents being formed by at least a channel. Each of the vents extends from a first side of the seal assembly to between the main seal and the dust seal, and an angle between a channel length axis of the channel and a trajectory of circumferential motion is ninety degrees, acute, or obtuse for each of the channels.

(17) The seal assembly according to (16), wherein the wear sleeve is the dust seal and the wear sleeve is part of the seal assembly.

(18) The seal assembly according to (16) or (17), wherein the vents are formed entirely in or by the wear sleeve.

(19) The seal assembly according to any one of (16) to (18), further comprising an auxiliary sleeve, wherein the vents are formed in or by the auxiliary sleeve.

The seal assembly according to any one of (16) to (19), wherein the wear sleeve includes, for each of the vents, the channel and an opening leading from the channel to between the main seal and the dust seal.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation. As used herein, a plan view may be regarded as a side elevational view.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A rotatable shaft assembly comprising:
    a rotatable shaft defining a shaft axis of rotation;
    a one-piece unitary wear sleeve circumscribing the rotatable shaft and being directly mounted on the rotatable shaft, a first side of the one-piece unitary wear sleeve facing and being at an outer surface of the rotatable shaft, wherein the one-piece unitary wear sleeve is purely cylindrical in the side profile view of the seal assembly; and
    a seal assembly circumscribing the rotatable shaft, wherein the seal assembly includes:
    a housing,
    a main seal mounted to the housing, the main seal including a mounting portion and a main seal lip, and the main seal being curved in a side profile view of the seal assembly,
    a dust seal having a mounting portion, and
    a plurality of vents circumferentially spaced from each other about the seal assembly,
    wherein each of the vents extends from outside the rotatable shaft assembly to a circumferential seal cavity between the main seal and the dust seal to prevent or minimize vacuum formation in the circumferential seal cavity,
    wherein a second side of the one-piece unitary wear sleeve opposite the first side thereof directly faces the circumferential seal cavity,
    wherein each of the vents is formed entirely in the one-piece, unitary wear sleeve, and
    wherein the one-piece, unitary wear sleeve includes a channel extending from a distal end of the one-piece, unitary wear sleeve that runs parallel to the shaft axis and an opening leading from the channel to the circumferential seal cavity forming each of the vents.

2. The rotatable shaft assembly according to claim 1, wherein the opening extends from the channel at ninety degrees for each of the vents.

3. The rotatable shaft assembly according to claim 1, wherein an angle between a channel length axis of each of the vents and a trajectory of circumferential motion of the rotatable shaft is ninety degrees.

4. The rotatable shaft assembly according to claim 1, wherein an angle between a channel length axis of each of the vents and a trajectory of circumferential motion of the rotatable shaft is acute or obtuse.

5. A rotatable shaft assembly comprising:
    a rotatable shaft defining a shaft axis of rotation;
    a one-piece unitary wear sleeve circumscribing the rotatable shaft, a first side of the one-piece unitary wear sleeve facing and being at an outer surface of the rotatable shaft, wherein the one-piece unitary wear sleeve is purely cylindrical in the side profile view of the seal assembly; and
    a seal assembly circumscribing the rotatable shaft,
    wherein the seal assembly includes:
    a housing,
    a main seal mounted to the housing, the main seal including a mounting portion and a main seal lip, and the main seal being curved in a side profile view of the seal assembly,
    a dust seal having a mounting portion, and
    a plurality of vents circumferentially spaced from each other about the seal assembly, wherein each of the vents extends from outside the rotatable shaft assembly to a circumferential seal cavity between the main seal and the dust seal to prevent or minimize vacuum formation in the circumferential seal cavity,
    wherein each of the vents is formed entirely in the one-piece, unitary wear sleeve,
    wherein the one-piece, unitary wear sleeve includes a channel extending from a distal end of the one-piece, unitary wear sleeve that runs parallel to the shaft axis and an opening leading from the channel to the circumferential seal cavity forming each of the vents, and
    wherein an angle between a channel length axis at least some of the vents and a trajectory of circumferential motion of the rotatable shaft is acute or obtuse.

6. The rotatable shaft assembly according to claim 5, wherein for each of the vents the opening extends from the channel at ninety degrees for each of the vents.

* * * * *